US008676449B2

(12) United States Patent
de Jonk et al.

(10) Patent No.: US 8,676,449 B2
(45) Date of Patent: Mar. 18, 2014

(54) VEHICLE GOVERNANCE SYSTEM

(75) Inventors: Kevin P. de Jonk, St. Ives (AU);
Campbell V. B. Watts, Killarney Heights (AU)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 13/189,022

(22) Filed: Jul. 22, 2011

(65) Prior Publication Data
US 2011/0288694 A1 Nov. 24, 2011

Related U.S. Application Data

(62) Division of application No. 11/686,974, filed on Mar. 16, 2007, now Pat. No. 8,024,092.

(51) Int. Cl.
*B60R 25/00* (2013.01)

(52) U.S. Cl.
USPC .............................................. 701/49; 307/9.1

(58) Field of Classification Search
USPC ............... 701/49, 32.2, 29.9, 32.3, 32.5, 424, 701/435; 340/426.35, 5.1, 5.2, 5.21–5.28, 340/5.3, 5.31–5.33; 307/9.1, 10.1, 10.2, 307/10.5, 10.6
See application file for complete search history.

(56) References Cited

U.S. PATENT DOCUMENTS

| 5,769,051 A | 6/1998 | Bayron et al. |
| 5,803,043 A | 9/1998 | Bayron et al. |
| 6,198,996 B1 * | 3/2001 | Berstis ............................. 701/36 |
| 6,232,874 B1 * | 5/2001 | Murphy .................... 340/426.19 |
| 6,271,745 B1 | 8/2001 | Anzai et al. |
| 6,285,948 B1 | 9/2001 | Takagi et al. |
| 6,310,542 B1 | 10/2001 | Gehlot |
| 6,873,248 B2 | 3/2005 | Ott |
| 6,888,445 B2 | 5/2005 | Gotfried et al. |
| 6,944,430 B2 * | 9/2005 | Berstis ........................ 455/186.1 |
| 2004/0212506 A1 | 10/2004 | Cheronny et al. |
| 2006/0181409 A1 | 8/2006 | Yamamoto et al. |

FOREIGN PATENT DOCUMENTS

JP  06-351111  12/1994

OTHER PUBLICATIONS

"Volvo's Multi-lock System Prevents Drunk Driving," http://www.strangenewproducts.com/2005/08/volvos-multi-locksystem-prevents.html, Aug. 22, 2005; and.
Michael Paine, "Safer Vehicles for Young Drivers," Nov. 2005, (p. 3, 4th Paragraph).

* cited by examiner

*Primary Examiner* — Dalena Tran
(74) *Attorney, Agent, or Firm* — Scully, Scott, Murphy & Presser PC; Ronald A. Kaschak

(57) ABSTRACT

Disclosed are a method and system for preventing the unauthorized use of a vehicle. A set of vehicle operating parameters is entered onto a person's driver's license, and that person registers as an authorized user of a specified vehicle. When that person enters the vehicle, the person inserts the driver's license into a card reader, and the card reader reads the operating parameters and enters those parameters onto a computing platform. The computing platform receives these operating parameters and checks to determine if the person is an authorized user of the vehicle. If the computing platform determines that the person is an authorized user, the computing platform sends the operating parameters to a control module within the vehicle. If the person then operates the vehicle, the control module controls the vehicle to maintain that operation within the operating parameters.

5 Claims, 1 Drawing Sheet

VEHICLE GOVERNANCE SYSTEM

RELATED APPLICATION

This application is a divisional of U.S. Ser. No. 11/686,974, filed Mar. 16, 2007, the entire contents of which are incorporated herein by reference.

BACKGROUND OF THE INVENTION

1. Field of the Invention

This invention generally relates to vehicle governance systems, and more particularly, to a method and system to prevent the unauthorized use of a vehicle.

2. Background Art

The motor vehicle has become an essential component of modern living. Many people own motor vehicles, many more use them, and virtually everyone relies, in one way or another, on the motor vehicle to provide the goods and services that are integral to a modern lifestyle.

Motor vehicles are used, for example, to transport people and goods from place to place in the ordinary course of daily commerce, such as to and from school, to and from work, and to and from stores, restaurants, and entertainment venues. In addition, motor vehicles are an essential part of emergency response procedures. Fire trucks are used to rush firemen and equipment to homes or buildings that are on fire, ambulances are used to rush people to hospitals and other medical facilities, and cars and vans may be used to rush police and other personnel to handle emergency situations.

As is well understood, motor vehicles are in very common use and, in the vast majority of cases, are properly and appropriately used. Vehicle use is, in real terms, controlled by the vehicle user. This is despite the fact that laws and regulations often limit aspects of vehicle use such as speed, driver licensing and carrying capacity. Enforcement of limits is at present retrospective; there are situations where vehicles are used improperly or in an unauthorized way. For instance, there may be the unauthorized use of a vehicle by either an unlicensed driver or a driver holding a restricted license. At the moment, there is no system that allows the use of a vehicle to be limited by, a person's license conditions. So an unlicensed driver can operate a vehicle with no check of the person's license being made and a person can exceed the limits of their license by operating the vehicle in a normal fashion. Currently, the only license validity check is performed when an operator is stopped by police and a physical check of the driver's license is made.

SUMMARY OF THE INVENTION

An object of this invention is to provide a vehicle governance system.

Another object of the invention is to provide a method and system for preventing unauthorized use of a vehicle by either an unlicensed driver or a driver holding a restricted license.

These and other objectives are attained with a method and system for preventing the unauthorized use of a vehicle. The method comprises the steps of entering into the governance system, a set of vehicle operating parameters for said driver's license, and said specified person registering as an authorized user of a specified vehicle. When that person enters the specified vehicle, the person identifies themselves to a biometric reader, the Vehicle governance system identifies the driver and retrieves the operating parameters for the drivers license, and any other operating parameters, and enters those operating parameters onto a computing platform.

The computing platform receives these operating parameters and, in response, checks to determine if the person is an authorized user of the vehicle. If the computing platform determines that the person is an authorized user of the vehicle, then the computing platform sends said operating parameters to a control module located within the vehicle. If the person then attempts to operate the vehicle and if said attempt is successful, the control module controls the operation of the vehicle to maintain that operation within the set of operating parameters.

The preferred embodiment of the invention, described in detail below, allows vehicle-operating parameters to be set up and govern the operation of a vehicle. The operation parameters are stored on the driver's license magnetic storage area and conveyed to the system via a card reader in the dashboard. Drivers holding licenses with restricted characteristics (learner's permits, provisional licenses, cancelled licenses) are allowed to operate a vehicle only under the conditions of the license, e.g., a learner would only be allowed to go 70 km/h in accordance with the law.

Further benefits and advantages of this invention will become apparent from a consideration of the following detailed description, given with reference to the accompanying drawing, which specifies and shows preferred embodiments of the invention.

DETAILED DESCRIPTION OF THE PREFERRED EMBODIMENTS

The present invention, generally, provides a vehicle governance system to help prevent unauthorized use of a vehicle. Generally, in accordance with the preferred embodiment of the present invention, a set of vehicle operating parameters are entered onto a person's driver's license, and that person also registers as an authorized user of a specified vehicle. When that person enters the specified vehicle, the person inserts the driver's license into a card reader, and the card reader reads the vehicle operating parameters on the driver's license and enters those operating parameters onto a computing platform.

The computing platform receives these operating parameters and, in response, checks to determine if the person is an authorized user of the vehicle. If the computing platform determines that the person is an authorized user of the vehicle, then the computing platform sends said operating parameters to a control module located within the vehicle. If the person then attempts to operate the vehicle and if said attempt is successful, the control module controls the operation of the vehicle to maintain that operation within the set of operating parameters.

Figure 1:
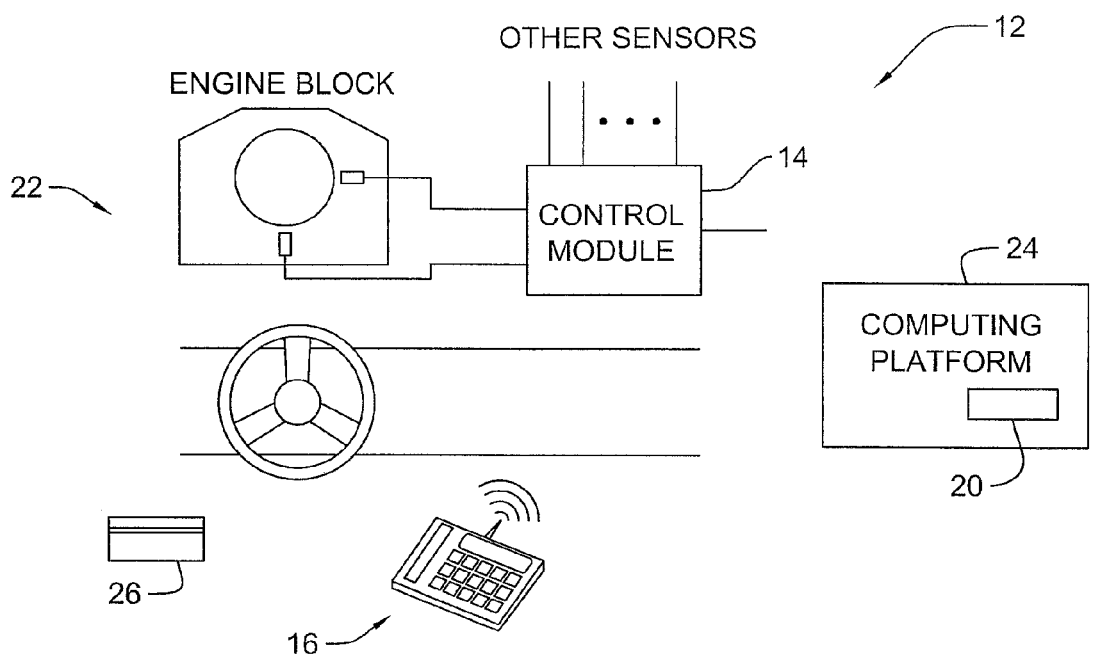
FIG. 1 illustrates a vehicle governance system embodying the present invention.

With particular reference to FIG. 1, the governance system 12 of the present invention comprises a control module 14, a card reader 16 and a software program, represented at 20. The control module 14 is located within the vehicle 22 with interfaces with already existing data collection sources (speedometer, odometer, engine management system, etc.). The card reader 16 is located in a convenient position within the cabin. The software program 20 resides on a computing platform 24 that allows configuration of the operating parameters of the vehicle.

The operating parameters of the vehicle by driver/license number are entered on the computing platform 24 and transmitted to the vehicle via RF or direct connection. When the vehicle operator's license 26 is scanned, the applicable parameters are loaded and the vehicle can be operated within those parameters. People operating a vehicle under restricted conditions would not be allowed to deviate from those conditions and a driver whose license had been cancelled would not be able to operate the vehicle at all.

Figure 2:
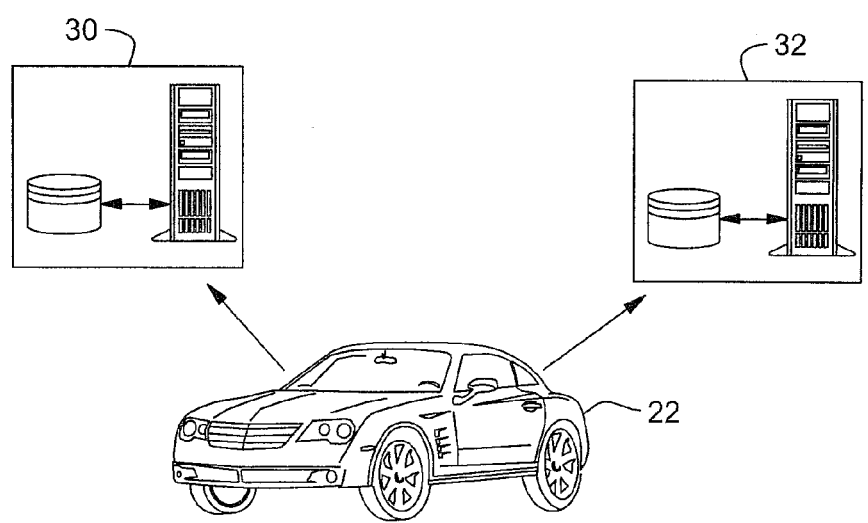
FIG. 2 shows a vehicle operated in accordance with the vehicle governance system.

With reference to FIG. 2, when an operator attempts to use the vehicle 22 and has not been identified as a registered user of the system, the onboard management system sends the license details to the system administrator, represented at 30, so at a minimum, the system administrator would know who is operating the vehicle. This may be done via a precoded SMS entry in the governance management system. At the same time, the licensing bureau, represented at 32, may be contacted via wireless or GPRS and the license holder's license details are transmitted to the vehicle to determine the vehicle's operating parameters. If connectivity to the licensing bureau was unavailable, a standard set of operating parameters could be used until actual license data was retrieved.

As the driver records each use of the vehicle, the information could be used to meet licensing conditions. For example, if a learner were required to complete 50 hours of driving as a prerequisite of being granted a provisional license, this invention would provide the historical data that would validate the claim.

The invention could be implemented in any vehicle where, for example, the operator is required to hold a valid license, such as a boat, a train, an aircraft, etc.

As will be readily apparent to those skilled in the art, the present invention, or aspects of the invention, can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of controlling operation of a machine comprising the steps of:
    storing a set of operating parameters on a magnetic storage device, the set of operating parameters being associated with a specified user;
    reading the set of operating parameters on the magnetic storage device and entering the set of operating parameters into a computing platform;
    the computing platform receiving the set of operating parameters on the magnetic storage device to determine if the specified user is an authorized user of the machine; and
    allowing a range of operation of the machine by the specified user depending on whether the specified user is an authorized user of the machine, including
    when the specified user is an authorized user of the machine, the computing platform sending the operating parameters to a control module on the machine;
    the specified user operating the machine;
    the control module on the machine controlling the operation of the machine to maintain the operation of the machine within the set of operating parameters;
    another person attempting to operate the machine, said another person having a driver's license and not being a registered user of the machine;
    the control module sending details of the driver's license of said another person to a system administrator to determine an identity of said another person; and
    transmitting details of the driver's license of said another person from a remote licensing bureau to the machine to determine the machine's operating parameters.

2. A method according to claim 1, wherein the operating parameters include:
    a limit on the speed of the machine;
    a limit on the distance the machine can be driven;
    a restriction on the time of day the machine can be driven;
    a restriction on the geographical locations the machine may be driven; and
    a restriction on the class of machine able to be driven.

3. A method according to claim 2, comprising the further step of, under defined conditions, the computing platform generating a signal to prevent operation of the machine.

4. The method according to claim 1, wherein:
    the magnetic storage device is in a drivers license; and
    the allowing a range of operation of the machine further includes:
    when the computing platform does not determine that the specified user is an authorized user of the machine, sending details of the driver's license to the system administrator, and contacting the remote licensing bureau;
    the remote licensing bureau sending details of the driver's license to the machines to determine the operating parameters; and
    operating the machine using a specified set of operating parameters until said details of the drivers license are retrieved.

5. The method according to claim 4, further comprising recording the amount of time the specified user operates the machine.

* * * * *

UNITED STATES PATENT AND TRADEMARK OFFICE
CERTIFICATE OF CORRECTION

PATENT NO. : 8,676,449 B2  
APPLICATION NO. : 13/189022  
DATED : March 18, 2014  
INVENTOR(S) : Kevin P. de Jonk and Campbell V. B. Watts It is certified that error appears in the above-identified patent and that said Letters Patent is hereby corrected as shown below:

On the Title page, item (74) please remove Ronald A. Kaschak.

Signed and Sealed this
First Day of September, 2015

Michelle K. Lee
*Director of the United States Patent and Trademark Office*